June 3, 1958 S. WILDER, JR 2,837,193
HYDRAULIC DRIVE WITH CENTRIFUGAL CONTROL FOR
SUBSTANTIALLY CONSTANT OUTPUT SPEED
Filed April 13, 1955 2 Sheets-Sheet 1
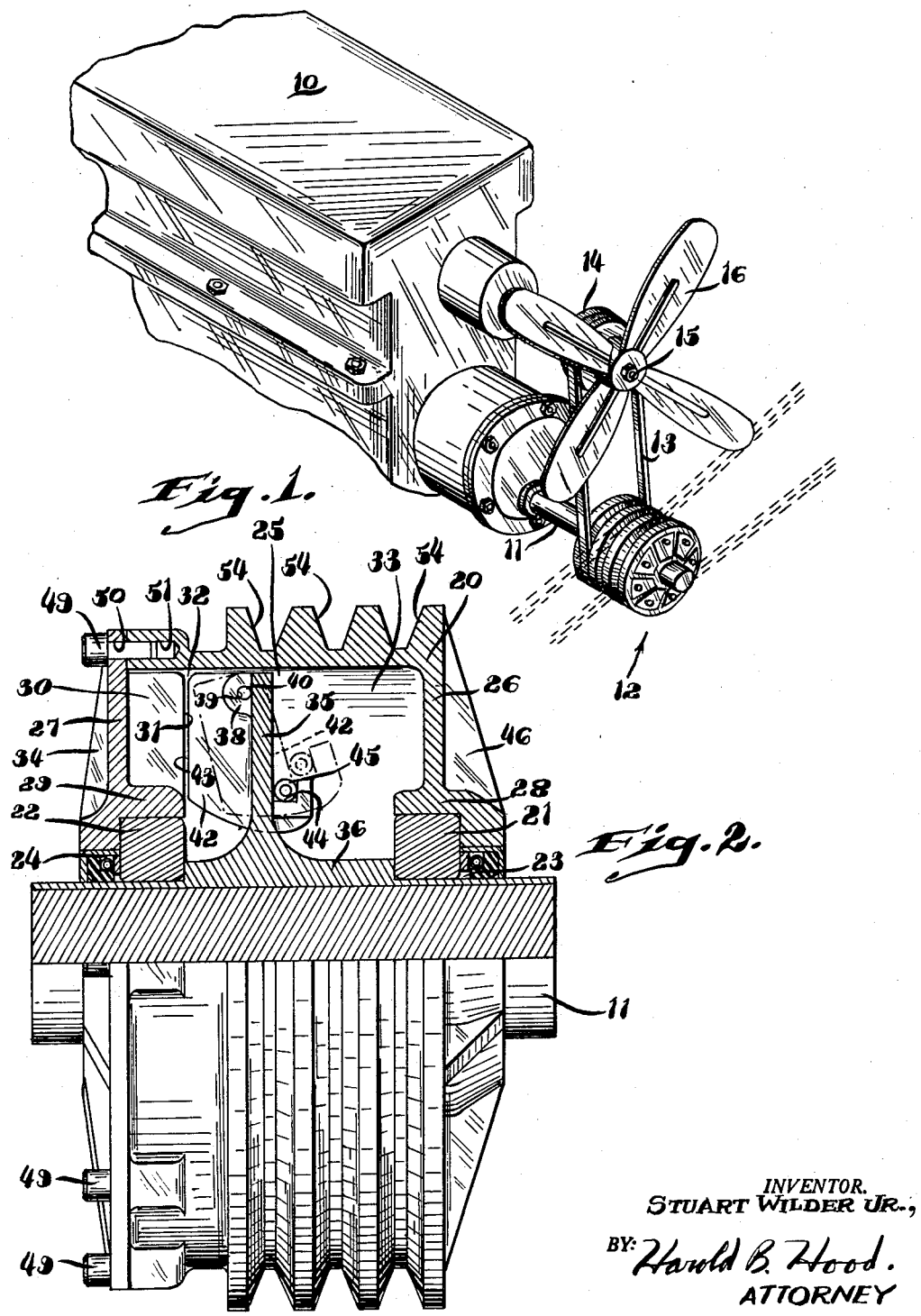
INVENTOR.
STUART WILDER JR.,
BY: Harold B. Hood.
ATTORNEY

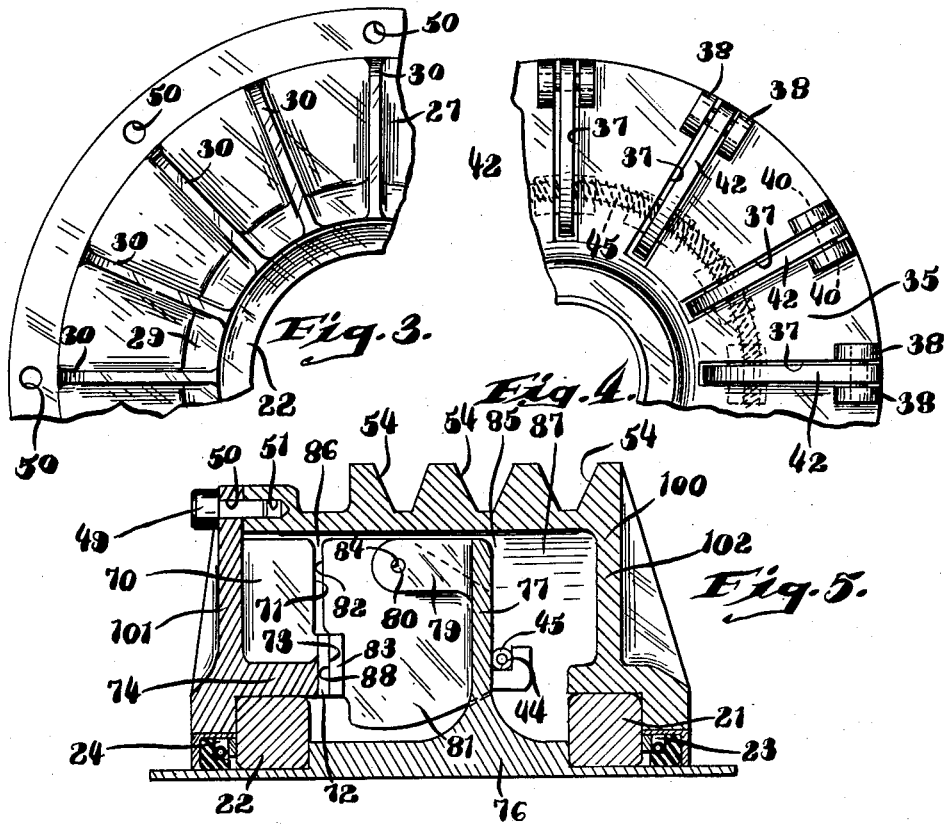
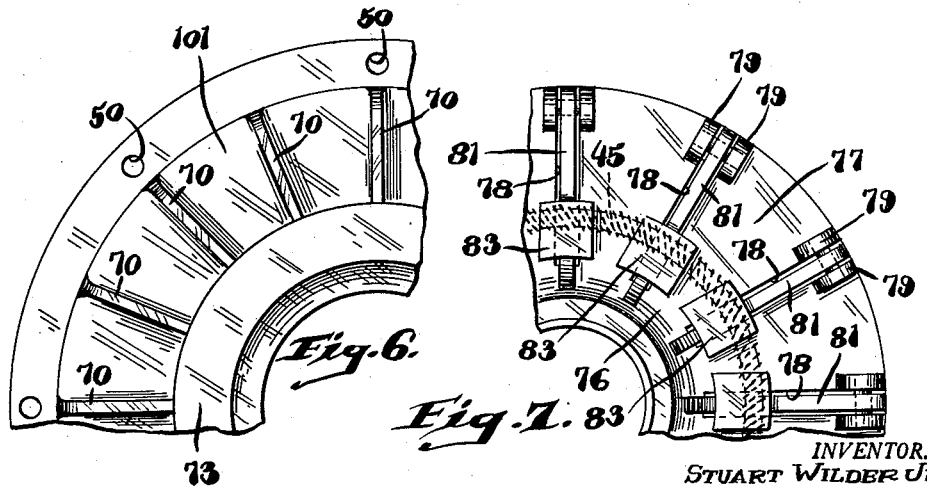

United States Patent Office 2,837,193
Patented June 3, 1958

2,837,193

HYDRAULIC DRIVE WITH CENTRIFUGAL CONTROL FOR SUBSTANTIALLY CONSTANT OUTPUT SPEED

Stuart Wilder, Jr., Columbus, Ind., assignor to The Reliance Electric and Engineering Company, Cleveland, Ohio, a corporation of Ohio Application April 13, 1955, Serial No. 501,028

15 Claims. (Cl. 192—104)

This invention relates to a hydraulic transmission unit, and more particularly to a hydraulic transmission unit having centrifugal control means to provide substantially constant speed power output. The invention finds particular utility in driving automobile accessories, and therefore, it has been illustrated and will be described in that environment, though it will be apparent that the apparatus disclosed herein might be applied in association with various other devices or machines.

More and more power-driven accessories are being provided on automobiles. Conventionally, these accessories are driven from the cooling fan shaft, and therefore, their speed of operation and power consumption is directly proportional to the speed of rotation of the crankshaft of the automobile. The accessories must, of course, operate effectively even at low engine speeds; and the result is that, at highway cruising speeds, all of the accessories are conventionally driven at unnecessarily high speeds, with the result that they drain excessive power from the engine.

It is accordingly an object of this invention to provide a hydraulic transmission unit which has a substantially constant output speed regardless of its input speed, so long as the input speed is greater than a predetermined magnitude.

A further object of this invention is to provide a hydraulic drive transmission unit which has an output speed substantially equal to the input speed at and below a predetermined input speed, and a substantially constant output speed when said input speed is above a predetermined magnitude.

A further principal object of my invention is to provide a hydraulic transmission unit which automatically effects predetermined output speeds in relation to its input speeds.

A further object of my invention is to provide a compact hydraulic transmission unit which is simple in construction, dependable in use, and economical to manufacture; and whose dimensions may be such as to permit its installation, in conventional automobiles, in place of the simple, multiple-groove pulley conventionally used for the transmission of power to accessory devices.

Further objects of the invention will become apparent as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a perspective view showing my improved transmission unit in operative association with an automobile engine;

Fig. 2 is a view, partly in section, showing one form of hydraulic transmission unit embodied within my invention;

Fig. 3 is a fragmentary view of a portion of the clutch element which mounts the axially stationary vanes, taken from the right-hand side of this element as shown in Fig. 2;

Fig. 4 is a fragmentary view showing a portion of the clutch element mounting the pivotal vanes, taken from the left-hand side of this element as shown in Fig. 2;

Fig. 5 is a fragmentary sectional view showing another form of hydraulic transmission unit embodying my invention;

Fig. 6 is a fragmentary view showing a portion of the clutch element which mounts the axially fixed blades, taken from the right-hand side of this element as shown in Fig. 5; and Fig. 7 is a fragmentary view showing a portion of the clutch element which mounts the pivotal vanes, taken from the left-hand side of this element as illustrated in Fig. 5.

Referring to Fig. 1 of the drawings, I have illustrated my transmission unit 12 in operative association with an automobile engine 10. Engine 10 is shown having a shaft member 11 projecting therefrom. Shaft 11 may be integral with and part of the crankshaft of engine 10, or it may be a separate shaft driven by the crankshaft of engine 10.

My improved hydraulic transmission unit 12 is shown in Fig. 1 in driving relationship with shaft 15 by means of belt 13 and pulley 14 to drive fan 16. Transmission unit 12 is operable to drive a plurality of automobile accessories (not shown) by means of further belts suggested by dotted lines in Fig. 1.

Referring to Figs. 2, 3 and 4, it is apparent that I have provided a housing 20 formed by a generally cup-shaped, annular member 26 and annular member 27 to provide an enclosed chamber 25. Chamber 25 is provided with the desired amount of hydraulic fluid. Annular members 26 and 27 are provided with hub portions 28 and 29, respectively, which are supported from shaft 11 through bearing means 21 and 22 for rotation relative thereto. Extending axially outwardly from each of bearings 21 and 22 is an annular socket 23 and 24, respectively, each of which is provided with suitable packing material to render chamber 25 fluid-tight.

Extending radially outwardly from hub portion 29 of annular member 27, is a plurality of radially disposed clutch pieces in the form of vanes 30 which, with annular member 27, form a clutch element. Vanes 30 are fixed with respect to member 27 and each is made to define an axially outboard edge 31, all of which preferably lie in a common plane perpendicular to the axis of member 27. Reinforcing ribs 34 may be provided on the exterior of annular member 27.

Annular member 35, having a hub portion 36 which is relatively fixed to shaft 11, divides fluid-tight chamber 25 into a transmission chamber 32 and a non-transmission chamber 33. Annular member 35 is provided with a plurality of radially disposed slots 37 which open to the outer periphery of this member. Ears 38 are provided at each side of each of the slots 37 to mount a pin 40 across each of the slots, said pin extending into and being supported by a socket 39 in each of the ears. Pivotally mounted on each of pins 40 is a clutch piece in the form of a pivotally mounted vane 42. Radially disposed, pivotally mounted vanes 42, with annular member 35, form another clutch element. Each of vanes 42 is so designed that its center of gravity is offset from pin 40 axially with respect to shaft 11 such that it lies at all times axially rearwardly of its respective pin 40 in a direction away from vanes 30 on annular member 27. Vanes 42 are resiliently biased toward the full line position shown in Fig. 2 by means of an annular coil spring 45 retained in a groove 44 in each of the vanes 42. Pivotal movement of each of vanes 42 toward vanes 30 is limited by engagement of spring 45 with the adjacent face of annular member 35. Each of vanes 42 is in rotatably fixed relation with respect to annular member 35 and shaft 11, and each is provided with a radially extending, axially facing edge 43.

Annular member 26 may be provided with a radially disposed set of reinforcing ribs 46. Annular members 26 and 27 are secured together by means of a plurality of headed screws 49, the shanks of which pass through apertures 50 in member 27 and thence into threaded, clamping engagement with interiorly threaded sockets 51 in annular member 26.

As is apparent from Fig. 2, the axially extending, radially outward surface of housing 20 is provided with a plurality of pulley grooves 54 for the reception of belts to drive the various accessories.

When shaft 11 is quiescent, pivotally mounted vanes 42 occupy the relative positions shown in full lines in Fig. 2. Upon rotation of shaft 11 by engine 10, annular member 35 rotates, carrying with it vanes 42. Since the center of gravity of each of the pivotally mounted vanes 42 is axially offset from its pivot pin 40, the resultant centrifugal force tends to swing blades 42 toward the dotted line position shown in Fig. 2. This centrifugal force tending to pivot vanes 42 so as to further separate respective vane edges 31 and 43, is opposed by the force exerted by annular spring member 45. Preferably, the parts are so designed that at a predetermined, relatively low rotational speed of shaft 11, blades 42 begin to pivot away from the full line position shown in Fig. 2. Accordingly, a rotational speed differential is effected between housing 20 and shaft 11. Preferably, the parts are so designed that above a predetermined speed of rotation of shaft 11, the resultant speed of rotation of housing 20 remains substantially constant regardless of any increase in rotational speed of shaft 11.

Referring to Figs. 5, 6 and 7, another form of my invention is shown. In this embodiment, the form and mounting of each of the clutch elements has been modified. The corresponding parts in Figs. 5, 6 and 7 which are of the same form as those in Figs. 2, 3 and 4, are identified by like reference numerals, and since the respective functions of these corresponding parts are the same in both embodiments, the description of them will not be repeated.

In this embodiment, a housing 100 is formed by annular members 101 and 102 to provide a fluid-tight chamber 85 therewithin. Annular member 101 is provided with a plurality of radially disposed blades 70 which are fixed with respect to member 101. Each of axially fixed blades 70 is provided with a radially outward edge 71. A ring 72, having a continuous friction surface 73, is carried by hub 74 of member 101 adjacent the radially-inward ends of the blades 70.

An annular member 77 having a hub portion 76 fixed with respect to shaft 11 (not shown in Fig. 5) divides fluid-tight chamber 85 within housing 100 into a transmission chamber 86 and a non-transmission chamber 87, respectively. Annular member 77 is provided with a plurality of radially disposed slots 78 which open to the radially outer periphery of member 77. At each side of each of the slots 78, an ear 79 is provided, having a socket 84 in which one end of a pin 80 is retained. Pivotally mounted on pins 80 is a vane 81, the center of gravity of which is offset from its respective pin axially with respect to the shaft 11 in a direction away from vanes 70. Each of pivotally mounted vanes 81 is provided with a radially outward edge 82 and a radially inward portion 83 having a friction surface 88 for cooperation with friction surface 73.

In operation, when shaft 11 rotates at relatively low speeds, friction surfaces 73 and 88 are retained in relative engagement by spring member 45, and substantially no speed differential is effected between pivotally mounted vanes 81 and axially fixed vanes 70. The parts are preferably designed such that slightly above a predetermined rotational speed of shaft 11, vanes 81 begin to pivot away from vanes 70, thus separating friction surfaces 88 and 73. Above this predetermined rotational speed of shaft 11, a speed differential between the two sets of vanes is effected in a manner corresponding to that in the other embodiment. That is, above a predetermined speed of rotation of shaft 11, which in this embodiment may or may not be the predetermined speed above which substantially no speed differential is effected, the rotational speed of housing 100 remains substantially constant with any increase in speed of shaft 11.

With respect to both of the disclosed embodiments, it is apparent that although the clutch element which includes the pivotally mounted vanes has been illustrated and described as the driving clutch element, the housing could alternatively be driven as the input to the transmission unit, whereby the clutch element which includes the axially fixed vanes would drive shaft 11 as the output. With this alternative arrangement, the transmission unit would effect substantially the same relative output speeds in relation to the corresponding input speeds as that provided with the arrangement shown in the drawing whereby shaft 11 is the input element and the housing is the output element.

I claim as my invention:

1. A device of the class described comprising a shaft member, a housing member rotatably mounted on said shaft member, said housing member providing a liquid-tight chamber therewithin, a first clutch element having a first set of clutch pieces disposed within said chamber in rotatably fixed relation with respect to one of said members, and a second clutch element comprising a second set of clutch pieces radially disposed about said shaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said shaft member, said pivotally mounted clutch pieces being yieldably biased toward said first clutch element.

2. A shaft member, a housing member rotatably mounted on said shaft member, said housing member providing a liquid-tight chamber therewithin, a first clutch element having a first set of clutch pieces disposed within said chamber in rotatably fixed relation with respect to said housing member, a second clutch element comprising a second set of clutch pieces radially disposed about said shaft member, each of the clutch pieces of said second set being pivotally mounted within said chamber in rotatably fixed relation with respect to said shaft member, the center of gravity of each of said pivotally mounted clutch pieces being offset from its pivotal axis in an axial direction with respect to said shaft member, and means for resiliently biasing said pivotally mounted clutch pieces toward said first clutch element.

3. The device of claim 1 wherein said first clutch element includes a plurality of vanes radially disposed with respect to said shaft member, and each of said pivotally mounted clutch pieces comprises a vane.

4. The device of claim 1 including a supporting annulus on which said clutch pieces are pivotally mounted, said annulus having a plurality of radial slots within each of which one of said pivotally mounted clutch pieces is adapted to pivot.

5. The device of claim 1 including a plurality of pulley grooves on the outer surface of said housing member.

6. The device of claim 1 wherein said first clutch element includes a friction surface and said second clutch element includes a friction surface in contact with the first-mentioned friction surface only when said second clutch element is not rotating at a rate exceeding a predetermined value.

7. The device of claim 1 wherein said first clutch element includes a friction surface and each of said pivotally mounted clutch pieces has a friction surface thereon which is in contact with the first-mentioned friction surface except when said second clutch element is rotating at a speed exceeding a predetermined value.

8. A device of the class described comprising a shaft member, a housing member rotatably mounted on said shaft member, said housing member providing a liquid-tight chamber therewithin, a first clutch element having a first set of clutch pieces disposed within said chamber in rotatably fixed relation with respect to one of said members, a second clutch element comprising a second set of clutch pieces radially disposed about said shaft member, each of the clutch pieces of said second set member being pivotally mounted within said chamber in rotatably fixed relation with respect to the other of said members, the center of gravity of each of said pivotally mounted clutch pieces being offset from its pivotal axis in an axial direction with respect to said shaft member, and means for resiliently biasing said pivotally mounted clutch pieces toward said first clutch element, each of said pivotally mounted clutch pieces of said second set including a transaxially extending groove, and said means for resiliently biasing said pivotally mounted clutch pieces toward said first clutch element comprising an annular, resilient member disposed in the grooves in said clutch pieces.

9. A device of the class described comprising an automobile engine having a crankshaft member, a housing member rotatably mounted on said crankshaft member, said housing member providing a liquid-tight chamber therewithin, a first clutch element having a first set of clutch pieces disposed within said chamber in rotatably fixed relation with respect to one of said members, a second clutch element comprising a second set of clutch pieces radially disposed about said crankshaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said crankshaft member, and means for resiliently biasing said pivotally mounted clutch pieces toward said first clutch element.

10. A device of the class described comprising an automobile engine having a crankshaft, a shaft member, transmission means between said crankshaft and said shaft member whereby said crankshaft drives said shaft member, a housing member rotatably mounted on said shaft member, said housing member providing a liquid-tight chamber therewithin, a first clutch element having a first set of clutch pieces disposed within said chamber in rotatably fixed relation with respect to one of said members, a second clutch element comprising a second set of clutch pieces radially disposed about said shaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said shaft member, and means for resiliently biasing said pivotally mounted clutch pieces toward said first clutch element.

11. In a device of the class described, a shaft, a hollow pulley element supported from said shaft for coaxial rotation relative thereto and defining a liquid-tight chamber therein, an element fixed to rotate with said shaft, a series of radially-extending vanes supported from said element within said chamber, a second series of radially-extending vanes supported from said pulley element to rotate with said pulley element and disposed within said chamber in facing, cooperative relation to said first series of vanes, said chamber being adapted to contain a body of liquid engaging all of said vanes, certain of said vanes being mounted for movement relative to their supporting element, in response to centrifugal forces, axially away from the vanes of the cooperating series.

12. In a device of the class described, a shaft, a hollow pulley supported from said shaft for coaxial rotation relative thereto, an element fixed to rotate with said shaft and carrying, within said hollow pulley, a series of radially-extending vanes, a second series of radially-extending vanes fixed to move with said pulley and disposed within said pulley in facing, cooperative relation to said first series of vanes, said pulley being adapted to contain a body of liquid engaging all of said vanes, certain of said vanes being mounted for movement, in response to centrifugal forces, axially away from the vanes of the cooperating series, means providing a continuous, annular friction surface moving with one of said series of vanes, each of the vanes of the other series being provided with a friction surface engageable, at times, with said annular friction surface, and means resiliently resisting movement of said certain vanes under the influence of centrifugal force and urging said last-named friction surfaces into driving engagement with said annular friction surface.

13. A device of the class described comprising a shaft member, a housing member rotatably mounted on said shaft member, said housing member providing a liquid-tight chamber therewithin, a first clutch element having a first set of clutch pieces disposed within said chamber in rotatably fixed relation with respect to one of said members, a second clutch element comprising a second set of clutch pieces radially disposed about said shaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said shaft member, and means for resiliently biasing said pivotally mounted clutch pieces toward said first clutch element.

14. A device of the class described comprising an automobile engine having a crankshaft member, a housing member rotatably mounted on said crankshaft member, said housing member providing a liquid-tight chamber therewithin, a first clutch element having a first set of clutch pieces disposed within said chamber in rotatably fixed relation with respect to one of said members, and a second clutch element comprising a second set of clutch pieces radially disposed about said crankshaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said crankshaft member, said pivotally mounted clutch pieces being yieldably biased toward said first clutch element.

15. A device of the class described comprising an automobile engine having a crankshaft, a shaft member, transmission means between said crankshaft and said shaft member whereby said crankshaft drives said shaft member, a housing member rotatably mounted on said shaft member, said housing member providing a liquid-tight chamber therewithin, a first clutch element having a first set of clutch pieces disposed within said chamber in rotatably fixed relation with respect to one of said members, and a second clutch element comprising a second set of clutch pieces radially disposed about said shaft member, each of the clutch pieces of said second set being pivotally mounted within said chamber in rotatably fixed relation with respect to the other of said members, the center of gravity of each of said pivotally mounted clutch pieces being offset from its pivotal axis in an axial direction with respect to said shaft member, said pivotally mounted clutch pieces being yieldably biased toward said first clutch element.

References Cited in the file of this patent

UNITED STATES PATENTS

| | | |
|---|---|---|
| 2,364,980 | Jimerson | Dec. 12, 1944 |
| 2,427,432 | Wilhelmy | Sept. 16, 1947 |

FOREIGN PATENTS

| | | |
|---|---|---|
| 725,729 | France | Feb. 16, 1932 |